R. S. BOHANNAN & N. DUGGER.
RAIL JOINT FOR WEIGHING SCALES.
APPLICATION FILED NOV. 23, 1910.
988,542.
Patented Apr. 4, 1911.
2 SHEETS—SHEET 2.
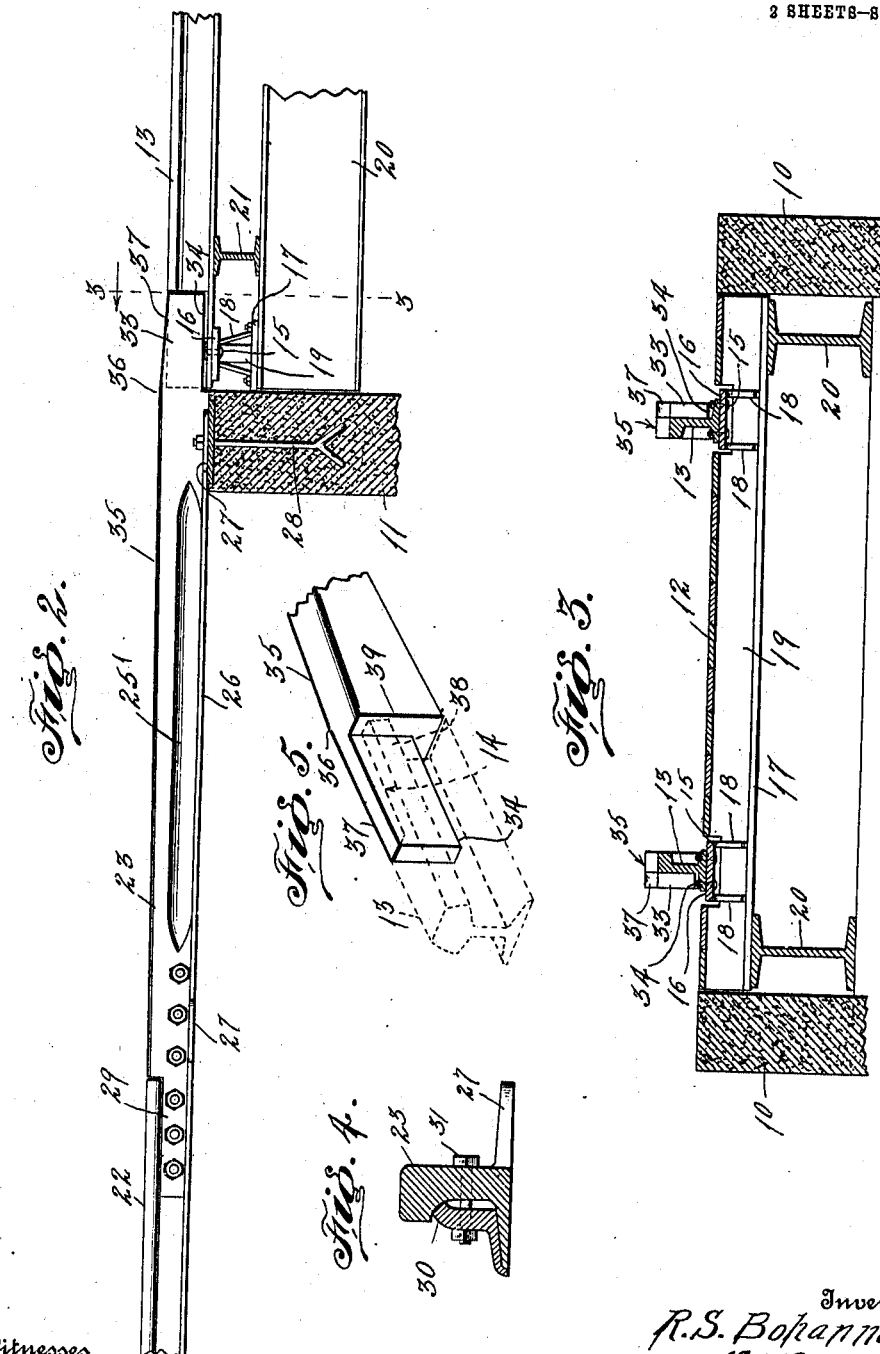
Witnesses
Jos Gregory
Francis Boyle
Inventors
R. S. Bohannan
N. Dugger
By
Attorneys

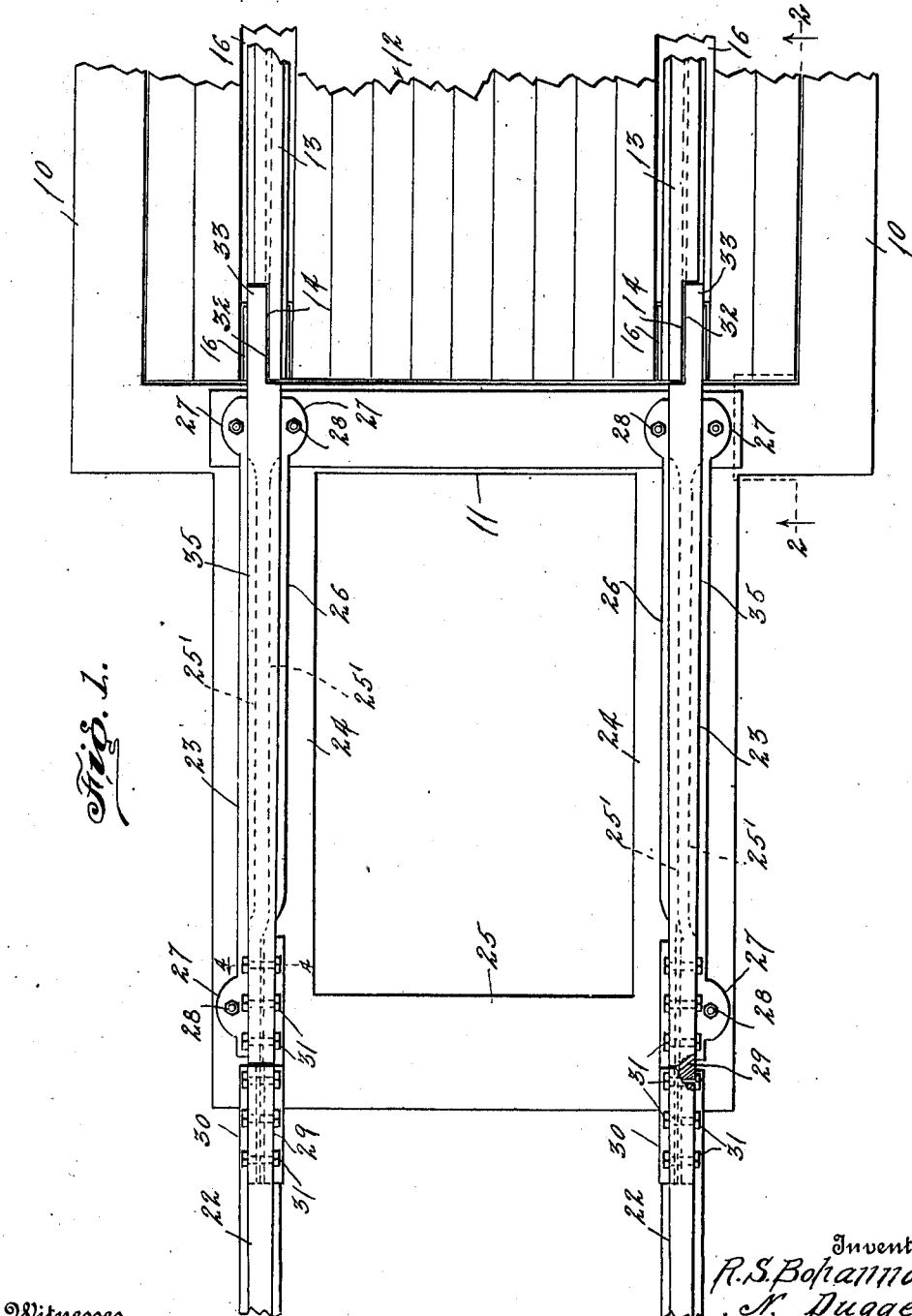

UNITED STATES PATENT OFFICE.

ROBERT S. BOHANNAN AND NEAL DUGGER, OF ENSLEY, ALABAMA.

RAIL-JOINT FOR WEIGHING-SCALES.

988,542.   Specification of Letters Patent.   Patented Apr. 4, 1911.

Application filed November 23, 1910. Serial No. 593,952.

*To all whom it may concern:*

Be it known that we, ROBERT S. BOHANNAN and NEAL DUGGER, citizens of the United States, residing at Ensley, in the county of Jefferson, State of Alabama, have invented certain new and useful Improvements in Rail-Joints for Weighing-Scales; and we do hereby declare the following to be a full, clear, and exact description of the invention, such as will enable others skilled in the art to which it appertains to make and use the same.

This invention relates to rail joints for railway weighing scales and has for an object to provide a practically continuous rail joint so that the "pounding" caused by car wheels passing over the openings at the abutting rail ends of ordinary rail joints is obviated.

A further object of the invention is to provide a rail joint that will prevent bounding of the cars as they pass off or on the weighing scales, thus reducing vibration and shocks transmitted from the scale rails to the beam and recorder of the scale.

A still further object is to provide a rail joint in which the approach rails to the scale will be positively anchored in permanent position so that binding with the confronting scale rails is obviated in order that proper action of the scales may be always assured.

A still further object is to provide non-friction rail joints on the approach rail ends that direct the car wheels to the scale rails without the friction between the parts normally attendant upon the offset treads of ordinary approach and scale rail joints.

With the above objects in view the invention consists of the novel details of construction and combination of parts hereinafter fully described and claimed, it being understood that various modifications may be made in the minor details of construction within the scope of the appended claims.

In the accompanying drawing forming part of this specification, Figure 1 is a plan view of part of a railroad scale platform showing the scale rails connected to the traffic rails by our improved rail joints. Fig. 2 is a longitudinal sectional view taken on the line 2—2 Fig. 1 with the platform removed. Fig. 3 is a cross sectional view taken on the line 3—3 Fig. 2. Fig. 4 is an enlarged cross sectional view taken on the line 4—4 Fig. 1. Fig. 5 is a detail perspective view of one of the approach rail ends with an interfitting scale rail shown in dotted lines.

Referring now to the drawing in which like characters of reference designate similar parts, the numerals 10 and 11 designate the scale pit side and end walls respectively, these walls preferably being formed of cement. A platform 12 is mounted for vertical movement within the scale pit and is connected with the scale beam and recorder of the scale weighing mechanism (not shown). A pair of rails 13 is fixed to the platform, the opposite ends of each rail being mutilated by the removal of the outer portion of the rail head, this mutilation being made in the vertical plane of the outer side of the rail web as shown at 14. That portion of the base flange of each rail underlying the mutilated portion of the rail head, is bolted as shown at 15 to approximately square metallic plates 16 which are supported in spaced relation upon a base plate 17 by inverted U-shaped truss braces 18, timbers 19 being engaged lengthwise through the braces and forming bolsters for the platform 12. The base plates 17 bear upon I-beams 20 that are arranged longitudinally in the scale pit and are secured in any preferred manner for permitting of the scale platform moving vertically and actuating the scale weighing mechanism. I-beams 21 are laid transversely across the longitudinal I-beams 20 and support the scale rails 13 and platform 12.

Although the above scale construction is illustrated in the drawing, it is not intended to limit the construction to this form as any preferred platform construction may be employed for supporting the scale rails 13, it being only necessary to form the rails 13 in the manner above described.

For supporting the traffic rails 22 in alinement with approach rails 23 that will be presently described, masonry approach walls 24 are formed with the end walls 11 of the scale pit, and extend in alinement with the traffic rails 22 and scale rails 13 and are connected by transverse walls 25 remote from the end walls.

Supported upon the approach walls are the above mentioned approach rails 23, each rail being formed from a single integral block of material, the side faces of which are hollowed out as shown at 25′ intermediate the ends of the rail to lighten the rail. The rail tapers from one end to its opposite end, having somewhat the shape of an elongated pyramid, the approach wall engaging face of the rail being formed with flanges 26 which correspond to the ordinary base flange of a rail.

The base flange is provided adjacent its opposite ends with semi-circular lips 27 through which studs 28 are passed, these studs being embedded in the adjacent end wall 11 of the scale pit and approach walls 24. The traffic rail confronting end of each approach rail is provided with an extension 29 which fits along one side of the traffic rail web and a splice bar 30 fits along the opposite side of the traffic rail web and along the alining side of the approach rail, bolts 31 being passed transversely through the splice bar and extension 29 to rigidly secure the approach rail to the traffic rail. That end of each approach rail which confronts the mutilated end of the scale rail, is formed with a rabbet 32 in one side that receives the tongue of the scale rail, the tongue 33 formed on the end of the approach rail fitting in the mutilation 14 of the scale rail thus forming a scarf joint. The lower face 34 of the tongue is cut away and loosely receives the base flange of the scale rail.

By now referring to Figs. 2 and 5 it will be noted that the tread 35 of each approach rail inclines upwardly from the traffic rail to a point 36 which overlies the inner face of the pit end wall 11, the tread thence inclining downwardly as shown at 37 from this point to its free end, where it is flush with the tread of the scale rail.

In the normal or unloaded position of the scale platform, the tread of the scale rail tongue 38 is disposed in approximately the horizontal plane of the approach rail apex 36, in which position of the parts a car may advance from the approach rails evenly on to the scale rails. Now as the weight of the car comes upon the scale rails, the platform will gradually sink until when the car is in final position upon the scale rails, the rails will have sunk until their treads are in the horizontal plane of the extreme free end of the approach rail inclines 37 as clearly shown in Fig. 2. As the car now leaves the scale rails, the platform will gradually rise carrying upwardly the scale rails until they reach their highest limit of movement or in other words until the treads of the scale rails lie in the horizontal plane of the approach rail apexes. It is now clear that by virtue of the inclines 37 of the approach rail tongues, that there will be continuous treads from the approach rails to the scale rails regardless of the various positions assumed by the latter during the weighing operation. A car thus passes on to and off from the scale rails without bounding, "pounding," and with minimum friction. It will be noted by referring to Fig. 2 in which position of the parts the scale rails are in loaded position, that the scale rails may move upwardly to their unloaded positions without obstruction from the approach rails, since those portions of the scale rail base flanges which underlie the cut away bottom faces of the approach rail tongues do not contact with the approach rail tongues even when the scale rails have risen to their unloaded position. Thus binding of the approach and scale rails is positively prevented and the true operation of the scales is always assured.

What is claimed, is:—

1. The combination with railway scale rails, of approach rails having tongues loosely interfitting with said scale rails, said tongues having inclined treads forming continuations of the scale rail treads during the various positions of the scale rails.

2. The combination with railway scale rails, of approach rails having tongues loosely interfitting with said scale rails, the treads of said approach rails inclining upwardly in the direction of said scale rails to a point adjacent to the interfitting portions of said approach and scale rails, thence inclining downwardly to the extreme free end of each approach rail tongue, a portion of the tongue treads lying in the horizontal plane of said scale rail treads during all the various positions assumed by said scale rails in weighing, and forming continuations of the scale rail treads for directing car wheels to and from the scale rails without jolting.

In testimony whereof, we affix our signatures in presence of two witnesses.

ROBERT S. BOHANNAN.
NEAL DUGGER.

Witnesses:
D. P. KNAPP,
HINTON BROOKS.

---

Copies of this patent may be obtained for five cents each, by addressing the "Commissioner of Patents, Washington, D. C."